(12) United States Patent
Faizan et al.

(10) Patent No.: US 12,210,692 B2
(45) Date of Patent: Jan. 28, 2025

(54) METHOD AND SYSTEM FOR PROVIDING A SMART WHITEBOARD CLEANER

(71) Applicant: Mirza Faizan, Irving, TX (US)

(72) Inventors: Mirza Faizan, Irving, TX (US); Vedanth Venkatesh, Plano, TX (US); Gabriel Bashir Khatri, Plano, TX (US); Iffra Mehek Pathan, Avenel, NJ (US); Saad Master, Edison, NJ (US); Rehan Sahir Ali, Carteret, NJ (US); Zahra Shifa Khatri, Plano, TX (US); Mirza Rizwan, Patna (IN); Samad Syed, Murphy, TX (US); Darshan Kumar, Frisco, TX (US); Mishaal Qureshi, Frisco, TX (US); Abdullah Hasani, Murphy, TX (US); Zaynab Khan, Murphy, TX (US)

( * ) Notice: Subject to any disclaimer, the term of this patent is extended or adjusted under 35 U.S.C. 154(b) by 256 days.

(21) Appl. No.: 17/948,427

(22) Filed: Sep. 20, 2022

(65) Prior Publication Data
US 2024/0094830 A1    Mar. 21, 2024

(51) Int. Cl.
*G06F 3/0354* (2013.01)
*G06F 1/3231* (2019.01)

(52) U.S. Cl.
CPC .......... *G06F 3/0354* (2013.01); *G06F 1/3231* (2013.01)

(58) Field of Classification Search
CPC ...... G06F 3/0354; G06F 1/3231; B43L 21/00; B43L 21/02; B43L 21/04
USPC ........................................................ 345/157
See application file for complete search history.

(56) References Cited

U.S. PATENT DOCUMENTS

| | | | |
|---|---|---|---|
| 2011/0162163 A1* | 7/2011 | Hsiau | B43L 21/02 15/97.1 |
| 2013/0229333 A1* | 9/2013 | Schwartz | G06F 1/3246 345/156 |
| 2022/0245265 A1* | 8/2022 | Silverstein | G06F 21/84 |

* cited by examiner

*Primary Examiner* — Mark Edwards

(57) ABSTRACT

A method to erase at least a certain amount of content presented on a whiteboard with a whiteboard cleaner is provided. The method includes uniformly dividing whiteboard screen into plurality of horizontal rows, wherein each row is configured with a switch button. The method includes selecting at least one switch button, by a user, to signify the certain amount of content that the user admires to erase. Further, the method includes receiving a command, by a transceiver, to automatically erase the certain amount of content selected by the user, wherein the command corresponds to an electronic signal configured with each switch button. The method further includes determining, by a processor, absence of the user for a predetermined time period, wherein based on determination, the system shuts off the white board to restrict access of unknown person to view the content of the whiteboard.

8 Claims, 3 Drawing Sheets

METHOD AND SYSTEM FOR PROVIDING A SMART WHITEBOARD CLEANER

TECHNICAL FIELD

The present invention generally relates to the field of electronic devices and electronic self-cleaning whiteboards and more particularly to a method and system for providing a smart whiteboard cleaning system with the ability to clean certain portions of the whiteboard.

BACKGROUND OF THE INVENTION

As is generally known in today's world, the use of whiteboards is well known and used in prior art. However, there are problems with the whiteboard which needs to be evolved with the changing times. Traditional whiteboards and their uses are widely used in office settings, schools, and even for personal use, yet erasing and keeping things confidential is difficult in view of the efforts required for cleaning and sometimes the shortage of time and at times a person might forget to erase the whiteboard leaving confidential information visible to everybody. There is a need for a whiteboard system that is capable of self-cleaning the white during timely intervals set by the user and reset instructions.

It is also a need based on the prior arts to prepare a system for the cleaning of the whiteboard based on the user's requirements of certain limited or selective portions to be reused. There is also a requirement based on the prior arts for the ability of the whiteboard to clean itself based on the absence of persons within a pre-defined distance from the whiteboard.

Thus, there is a need of a smart whiteboard system that can be installed onto any traditional whiteboard and capable of maintaining the confidentiality of the text on the whiteboard with the ability to clean itself automatically and based on the requirements of the user by receiving and understanding the user inputs. It is also a requirement to be able to clean a portion of the whiteboard such as a particular row or column based on the instructions received from the user.

In conclusion, there is a need for a smart whiteboard system that is capable of self-cleaning and performing tasks based on the requirements and instructions of the user wherein the system and its components are economical and simple in manufacture and use.

Further limitations and disadvantages of conventional and traditional approaches will become apparent to one of skill in the art, through comparison of described systems with some aspects of the present disclosure, as set forth in the remainder of the present application and with reference to the drawings.

SUMMARY OF THE INVENTION

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, the present invention discloses a method and system for providing a smart whiteboard cleaner. The present disclosure provides a system to automatically erase contents written on the whiteboard such that the whiteboard is divided into a plurality of horizontal rows, wherein each row is configured with a switch. In one example, the user can manually select the switch corresponding to each row, in order to erase the content of the whiteboard. In another example, the whiteboard is configured with a remote to automatically erase a part or all of the board. The attachment has a top eraser going vertically and a side eraser going horizontally. Another feature is erasing the board if there is no one in the vicinity for a predetermined time period, for an instance more than 15 minutes. There is a button on the remote to specifically turn this off if the user wants to preserve the board.

According to embodiments illustrated herein, there may be provided a method to erase at least a certain amount of content presented on a whiteboard with a whiteboard cleaner. The method includes uniformly dividing, by a processor, the whiteboard screen into a plurality of horizontal rows, wherein each row is configured with a switch button. Next, the method includes selecting at least one switch button, by a user, to signify the certain amount of content that the user admires to erase. Further, the method includes receiving a command, by a transceiver, to automatically erase a certain amount of content selected by the user, wherein the command corresponds to an electronic signal configured with each switch button. Lastly, the method includes determining, by the processor, the absence of the user for a predetermined time period, wherein based on the determination, the system shuts off the whiteboard to restrict access of an unknown person to view the content of the whiteboard.

According to embodiments illustrated herein, there may be provided a system to erase at least a certain amount of content presented on a whiteboard with a whiteboard cleaner. The system includes uniformly dividing the whiteboard screen into a plurality of horizontal rows, wherein each row is configured with a switch button. The system further includes a user selecting at least one switch button to signify a certain amount of content that the user admires to erase. Next, the system includes a transceiver to receive a command to automatically erase a certain amount of content selected by the user, wherein the command corresponds to an electronic signal configured with each switch button. Lastly, the system includes a processor to determine the absence of the user for a predetermined time period, wherein based on the determination, the system shuts off the whiteboard to restrict access of an unknown person to view the content of the whiteboard.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference features and components. Some embodiments of system and/or methods in accordance with embodiments of the present subject matter are now described, by way of example only, and with reference to the accompanying figures, in which.

DETAILED DESCRIPTION

Figure 1:
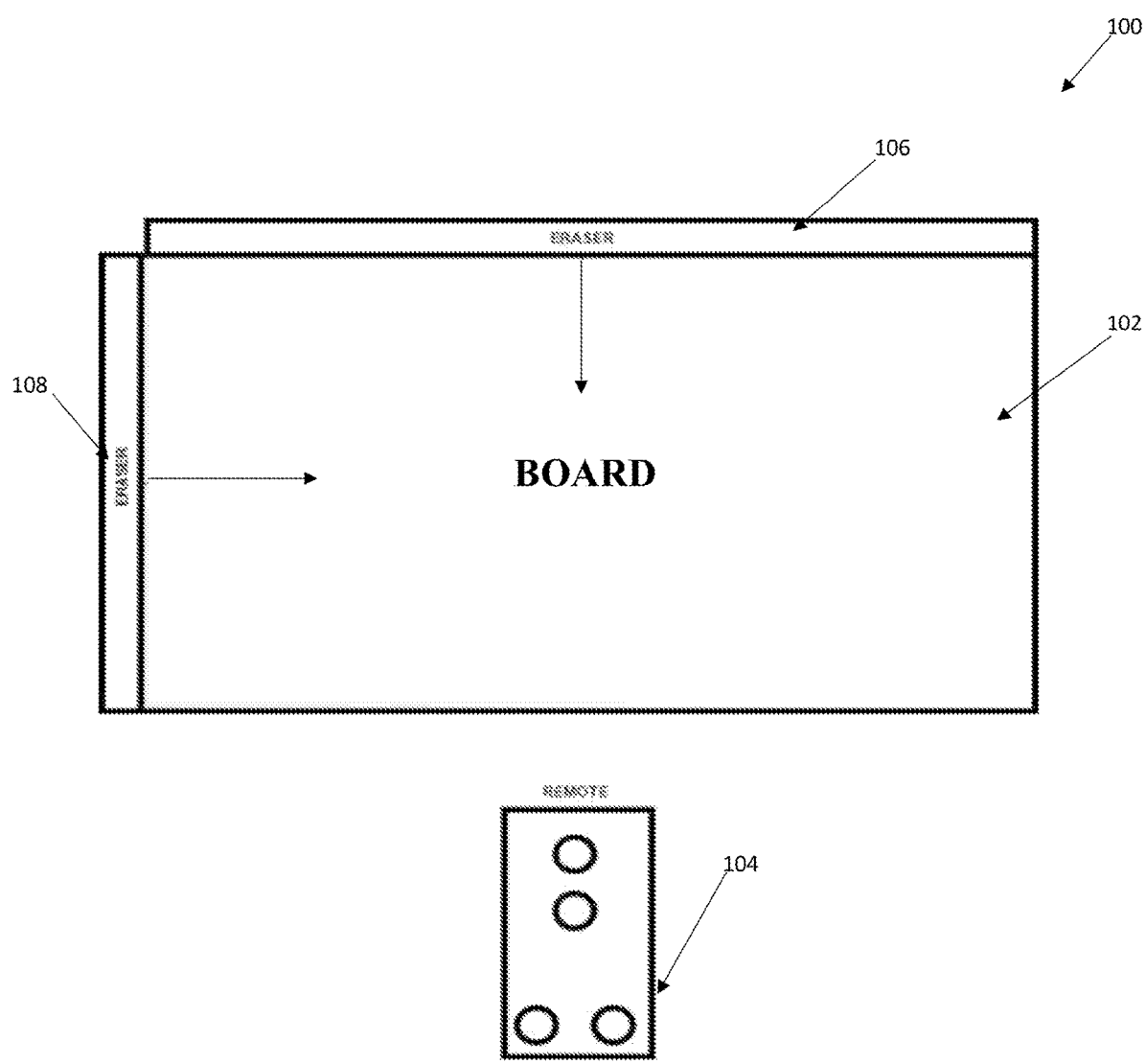
FIG. 1 is an exemplary network environment diagram 100 that illustrates a smart whiteboard cleaner, in accordance with some embodiments of the present disclosure.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specify the presence of what follows e.g. component and do not exclude or preclude the presence of additional, non-recited components, features, element, members, steps, known in the art or disclosed therein.

Furthermore, the terms first, second, third, and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention and form different embodiments, as would be understood by those in the art. For example, in the following claims, any of the claimed embodiments may be used in any combination.

It is desirable to have a new system and method that solves the above challenges as well as helps the users with a cost-effective, reliable, and efficient way of managing the day-to-day work. The present device is capable of understanding specific inputs and gestures from the user enabling him to erase the whiteboard with the help of an eraser. The present device also aids in providing easy and accessible input to the processing unit based on the user's inputs without hindering and causing problems. Another feature is erasing the board if there is no one in the vicinity for more than 15 minutes. There is a button on the remote to specifically turn this off if the user wants to preserve the board.

FIG. 1 illustrates an environment 100 in a whiteboard 102 is present in a classroom. The environment 100 further includes a remote 104 for selecting the content to erase. The whiteboard 102 includes a top eraser 106 for erasing the content from the whiteboard 102 in vertical direction and a side eraser 108 for erasing the content from the whiteboard 102 in horizontal direction. For example, the top eraser 106 moves in vertical direction on the whiteboard 102 and the side eraser 108 moves in horizontal direction on the whiteboard 102.

Figure 2:
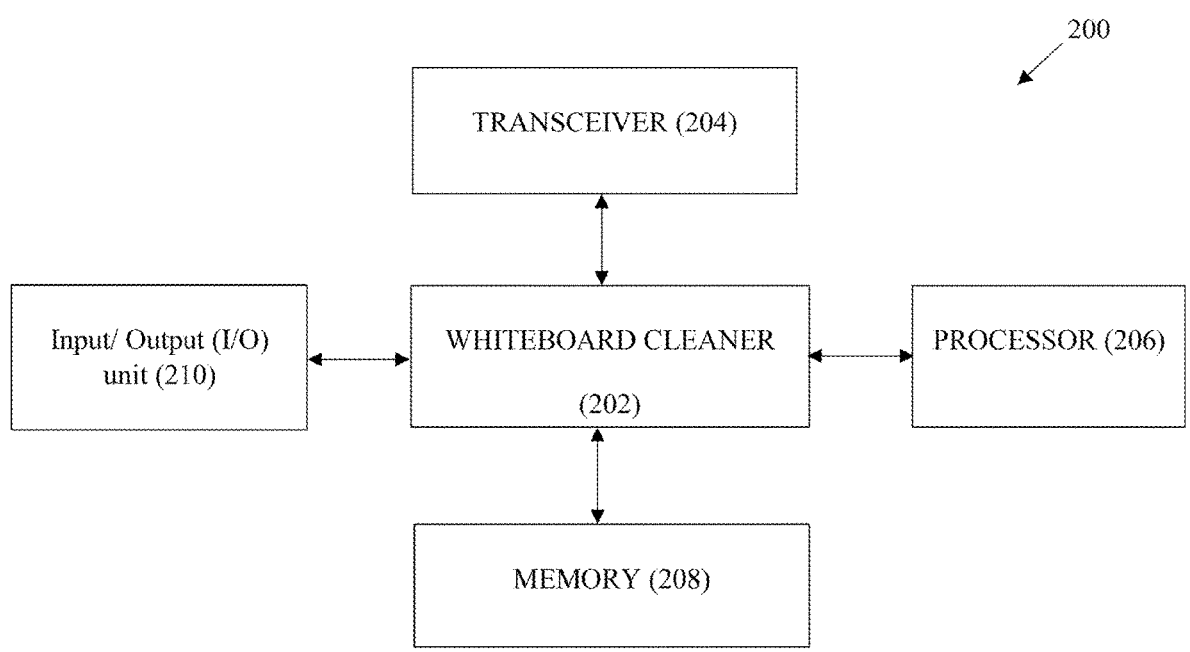
FIG. 2 is a block diagram 200 that illustrates a smart whiteboard cleaner, in accordance with some embodiments of the present disclosure

FIG. 2 is a diagram that illustrates a block diagram 200 of a smart whiteboard cleaner, in accordance with some embodiments of the present disclosure. The system 200 may include a whiteboard cleaner 202, a transceiver 204, a processor 206, a memory 208, and a Input/Output (I/O) unit 210. The whiteboard cleaner 202 may be communicatively coupled to the Transceiver 204, and the processor 206 via the whiteboard cleaner 202.

The processor 206 comprises suitable logic, circuitry, interfaces, and/or code that may be configured to execute a set of instructions stored in the memory 208. The processor 206 may be implemented based on a number of processor technologies known in the art. Examples of the processor 206 include but are not limited to, an X86-based processor, a Reduced Instruction Set Computing (RISC) processor, an Application-Specific Integrated Circuit (ASIC) processor, a Complex Instruction Set Computing (CISC) processor, and/ or other processors.

Memory 208 comprises suitable logic, circuitry, interfaces, and/or code that may be configured to store the set of instructions, which may be executed by the processor 206. In an embodiment, the memory 208 may be configured to store one or more programs, routines, or scripts that may be executed in coordination with the processor 206. The memory 208 may be implemented based on a Random Access Memory (RAM), a Read-Only Memory (ROM), a Hard Disk Drive (HDD), a storage server, and/or a Secure Digital (SD) card.

The transceiver 204 comprises suitable logic, circuitry, interfaces, and/or code that may be configured to receive input from a user to connect the smart whiteboard cleaner 202 with the whiteboard to erase a part or all of the whiteboard.

The transceiver 204 may implement one or more known technologies to support wired or wireless communication with the communication network. In an embodiment, the transceiver 204 may include, but is not limited to, an antenna, a radio frequency (RF) transceiver, or a Universal Serial Bus (USB) device. The transceiver 204 may communicate via wireless communication with networks, such as the Internet, an Intranet and/or a wireless network, such as a cellular telephone network, a wireless local area network (LAN), and/or a metropolitan area network (MAN). The wireless communication may use any of a plurality of communication standards, protocols, and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The Input/Output (I/O) unit 210 comprises suitable logic, circuitry, interfaces, and/or code that may be configured to receive input or transmit an output. The input/output unit 210 comprises various input and output devices that are configured to communicate with the processor 206. Examples of the input devices include, but are not limited to, a keyboard, a mouse, a joystick, a touch screen, a microphone, and/or a docking station. Examples of the output devices include, but are not limited to, a display screen and/or a speaker.

In an embodiment of the present disclosure, a system 200 for providing a smart whiteboard cleaner 202 is disclosed. The system includes transceiver 204 to receive input from a user to connect the smart whiteboard cleaner 202 with the whiteboard to erase a part or all of the whiteboard. The smart whiteboard cleaner 202 is configured with an attachment along with a remote. The attachment is further configured to connect the remote with the whiteboard cleaner. This attachment is further used as the connecting module which holds the remote in place and is easily accessible to the user as well. Further, the processor 206 is configured to determine the action of the whiteboard cleaner 202 to erase vertically and erase horizontally. Also, a Input/Output (I/O) unit 210 to enable the action of the user to be displayed on the smart whiteboard cleaner 202 is disclosed.

In yet another embodiment of the present disclosure, the system comprises a top eraser that moves vertically to erase the whiteboard; and a side eraser that moves horizontally to erase the whiteboard. Further, the system is configured to receive the input on the remote to specifically turn off the whiteboard cleaner 202 if the user wants to preserve the whiteboard. Also, the system is configured to erase the whiteboard if the whiteboard is not erased for more than 15 minutes with the smart whiteboard cleaner 202.

The present invention also includes a memory 208. The memory is coupled to the whiteboard cleaner 202 and is configured to store the data present on the whiteboard. In an example embodiment, the present system may be used by a teacher in order to teach a group of students. In this case, the students or teachers are not required to erase the contents of the whiteboard manually. The present disclosure allows the eraser configured in the whiteboard to automatically erase the contents of the whiteboard.

In yet another embodiment of the present disclosure, a method and apparatus are disclosed herein for automatically ending an interactive device session. In one embodiment, the system logs out a user, delete locally stored data created during a session, and place one or more system hardware components in a reduced power consumption state based on occupancy sensor data.

In yet another embodiment of the present disclosure, a system and method for presenting and capturing images on a presentation board are described. More particularly, embodiments of the present invention provide a projector to display one or more images onto a surface and the camera adapted to capture one or more images from the surface. Also, a user can control the presentation system by modifying one or more images on the surface.

Figure 3:
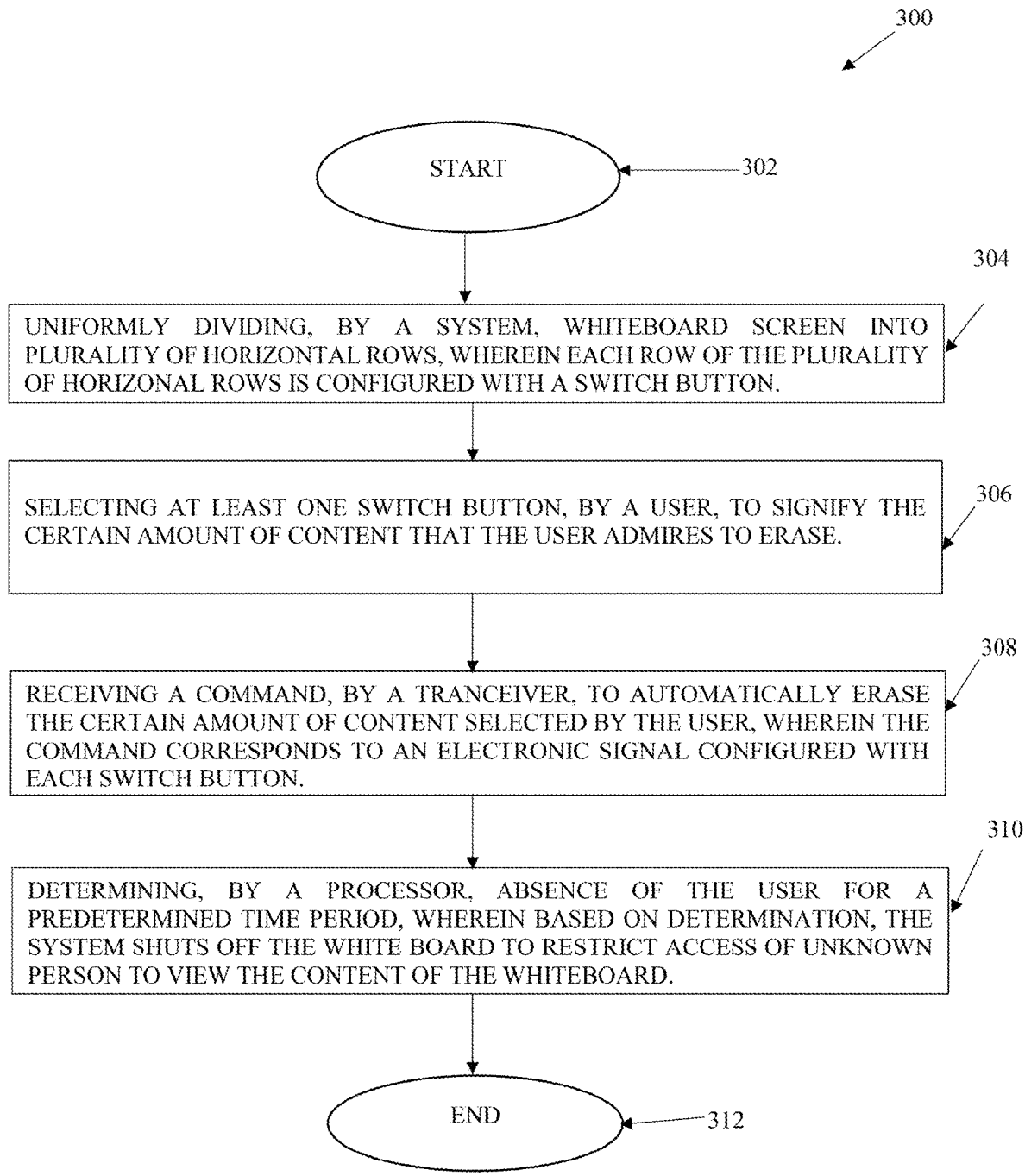
FIG. 3 is a flow diagram 300 that illustrates a smart whiteboard cleaner, in accordance with some embodiments of the present disclosure; and It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer-readable medium and executed by a computer or processor, whether or not such computer or processor is explicitly shown.

FIG. 3 is a flow diagram 300 that illustrates method for a smart whiteboard cleaner, in accordance with some embodiments of the present disclosure. The method begins at step 302. At step 304, the method includes uniformly dividing, by a system, the whiteboard screen into a plurality of horizontal rows, wherein each row of the plurality of horizontal rows is configured with a switch button. At step 306, the method further includes selecting at least one switch button, by a user, to signify the certain amount of content that the user admires to erase.

At step 308, the method also includes receiving a command, by a transceiver, to automatically erase a certain amount of content selected by the user, wherein the command corresponds to an electronic signal configured with each switch button. At step 310, the method includes determining, by a processor, the absence of the user for a predetermined time period, wherein based on the determination, the system shuts off the whiteboard to restrict access of an unknown person to view the content of the whiteboard. The method finally terminates at step 312.

In yet another embodiment of the present disclosure, the method also includes a top eraser that moves vertically to erase the whiteboard and a side eraser that moves horizontally to erase the whiteboard. Further, the method includes receiving the input on the remote to specifically turn off the whiteboard cleaner 202 if the user wants to preserve the whiteboard. Also, the method includes erasing the whiteboard if the whiteboard is not erased for more than 15 minutes with the smart whiteboard cleaner 202. Further, a memory 208 is configured to store the data present on the whiteboard.

In an example embodiment, one aspect of the present disclosure may be useful for educational purposes and commercial purposes as well. In an example, the teacher while teaching may make use of the whiteboard cleaner 202 in order to write on the wall. This removes the need of using a manual eraser to erase. Further, the present invention may store the data in the storing unit as well for future purposes.

In yet another example embodiment, the present invention may be used by a professional for his presentation. Therefore, the present system becomes very reliable and easy to use. There may be any number of user computers and any number of server computers. Users of computers described herein, for example, maybe interact with the disclosed systems. These computers may be operated by these users.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The present disclosure provides a system to erase at least a certain amount of content presented on a whiteboard with a whiteboard cleaner. The system includes uniformly dividing the whiteboard screen into a plurality of horizontal rows, wherein each row is configured with a switch button. Further, the system is provided with a user to select at least one switch button to signify the certain amount of content that the user admires to erase. The system is further configured to receive a command to automatically erase a certain amount of content selected by the user, wherein the command corresponds to an electronic signal configured with each switch button. The processor is configured to determine the absence of the user for a predetermined time period, wherein based on the determination, the system shuts off the whiteboard to restrict access of an unknown person to view the content of the whiteboard.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method to erase at least a certain amount of content presented on a whiteboard with a whiteboard cleaner, the method comprising:
   uniformly dividing a whiteboard screen into a plurality of horizontal rows, wherein each row of the plurality of horizontal rows is configured with a switch button;
   selecting at least one switch button, by a user, to signify a certain amount of content that the user desires to erase;
   receiving a first command, by a transceiver, to automatically erase the certain amount of the content selected by the user, wherein the first command corresponds to an electronic signal configured with each switch button; and receiving a second command, by the transceiver, to turn off the whiteboard cleaner if the user wants to preserve the content of the whiteboard.

2. The method as claimed in claim 1, wherein the smart whiteboard cleaner is provided with an attachment along with a remote, and wherein the attachment comprises:
 a top eraser configured to move vertically to erase the whiteboard; and
 a side eraser configured to move horizontally to erase the whiteboard.

3. The method as claimed in claim 1, further comprising:
 erasing the whiteboard if the whiteboard is not erased for more than 15 minutes with the smart whiteboard cleaner.

4. The method as claimed in claim 1, further comprising:
 a memory configured to store the data present on the whiteboard.

5. A system to erase at least a certain amount of content presented on a whiteboard with a whiteboard cleaner, the system comprising:
 a processor configured to uniformly divide a screen of the whiteboard into a plurality of horizontal rows, wherein each row is configured with a switch button, wherein at least one switch button is selected by a user to signify a certain amount of content that the user desires to erase; and
 a transceiver configured to:
  receive a first command to automatically erase the certain amount of the content selected by the user, wherein the first command corresponds to an electronic signal configured with each switch button; and
  receive a second command to turn off the system if the user wants to preserve the content of the whiteboard.

6. The system as claimed in claim 5, wherein the system comprises a top eraser configured to move vertically to erase the whiteboard; and a side eraser configured to move horizontally to erase the whiteboard.

7. The system as claimed in claim 5, wherein the system is configured to erase the whiteboard if the whiteboard is not erased for more than 15 minutes with the smart whiteboard cleaner.

8. The system as claimed in claim 5, further comprising a memory configured to store the data present on the whiteboard.

* * * * *